(12) United States Patent
Albinger et al.

(10) Patent No.: US 12,116,945 B2
(45) Date of Patent: Oct. 15, 2024

(54) RPM MODULE FOR OUTDOOR POWERED EQUIPMENT

(71) Applicant: HUSQVARNA AB, Huskvarna (SE)

(72) Inventors: Matthew Albinger, Shelby, NC (US); Scott Kirkpatrick, Hickory, NC (US)

(73) Assignee: HUSQVARNA AB, Huskvarna (SE)

( * ) Notice: Subject to any disclaimer, the term of this patent is extended or adjusted under 35 U.S.C. 154(b) by 364 days.

(21) Appl. No.: 17/600,292

(22) PCT Filed: Oct. 30, 2019

(86) PCT No.: PCT/IB2019/059301
§ 371 (c)(1),
(2) Date: Sep. 30, 2021

(87) PCT Pub. No.: WO2021/048605
PCT Pub. Date: Mar. 18, 2021

(65) Prior Publication Data
US 2022/0205402 A1 Jun. 30, 2022

Related U.S. Application Data

(60) Provisional application No. 62/897,478, filed on Sep. 9, 2019.

(51) Int. Cl.
*F02D 41/00* (2006.01)
*F02D 41/04* (2006.01)
(Continued)

(52) U.S. Cl.
CPC ....... *F02D 41/0097* (2013.01); *F02D 41/042* (2013.01); *F02D 41/22* (2013.01);
(Continued)

(58) Field of Classification Search
CPC .... F02D 41/0097; F02D 41/042; F02D 41/22; F02D 2200/101; G05B 23/0283; G07C 5/0808
See application file for complete search history.

(56) References Cited

U.S. PATENT DOCUMENTS 5,860,406 A 1/1999 Schmidt et al.
8,405,384 B1 3/2013 Antoine et al.
(Continued)

FOREIGN PATENT DOCUMENTS

CN 109142780 A 1/2019
EP 3080620 B1 7/2019
(Continued)

OTHER PUBLICATIONS

International Search Report and Written Opinion for International Application No. PCT/IB2019/059301 mailed May 12, 2020.

*Primary Examiner* — Grant Moubry
*Assistant Examiner* — Ruben Picon-Feliciano
(74) *Attorney, Agent, or Firm* — Burr & Forman LLP

(57) ABSTRACT

An RPM module for insertion into outdoor power equipment driven by an engine may include an extraction interface configured to be inserted proximate to the engine to passively extract information indicative of RPM from the engine, an RPM monitor operably coupled to the extraction interface to convert the information indicative of RPM into RPM data, and processing circuitry configured to utilize the RPM data to perform control or monitoring of the engine based on the RPM data.

20 Claims, 4 Drawing Sheets

(51) Int. Cl.
  *F02D 41/22*  (2006.01)
  *G05B 23/02*  (2006.01)
  *G07C 5/08*  (2006.01)

(52) U.S. Cl.
  CPC ....... *G05B 23/0283* (2013.01); *G07C 5/0808* (2013.01); *F02D 2200/101* (2013.01)

(56) References Cited

U.S. PATENT DOCUMENTS

| | | |
|---|---|---|
| 2011/0118083 A1 | 5/2011 | Nishimaki et al. |
| 2015/0019280 A1 | 1/2015 | Mejegård et al. |
| 2015/0058062 A1* | 2/2015 | Mejegard ................. G01P 3/00 705/7.42 |
| 2015/0066309 A1 | 3/2015 | Porter et al. |
| 2016/0007526 A1* | 1/2016 | Greulich ............... F16H 7/1281 56/14.7 |

FOREIGN PATENT DOCUMENTS

| | | |
|---|---|---|
| JP | S60259968 A | 12/1985 |
| KR | 2016146335 A | 12/2016 |

\* cited by examiner

RPM MODULE FOR OUTDOOR POWERED EQUIPMENT

CROSS REFERENCE TO RELATED APPLICATION

This application claims priority to U.S. application No. 62/897,478 filed Sep. 9, 2019, the entire contents of which are hereby incorporated by reference in its entirety.

TECHNICAL FIELD

Example embodiments generally relate to outdoor power equipment and, more particularly, some embodiments relate to a module that can be added to such equipment for monitoring engine revolutions per minute (RPM) and, in some cases, providing the capability to manage operation of the equipment based on the monitored RPM.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers provide the convenience of a riding vehicle as well as a typically larger cutting deck as compared to a walk-behind model.

The engines used to power the lawn mowers described above, and many other hand-held, walk-behind, or ride-on pieces of outdoor power equipment (e.g., chainsaws, blowers, snow throwers, tillers, edgers, etc.) are commonly gasoline or petrol engines. The engines come in various different sizes and have different manufacturers and design features. Meanwhile, the employment of microprocessor control of such devices is becoming more and more common, and desirable. In this regard, whether outdoor power equipment is owned by a company with an entire fleet of such devices, or by an individual owner with one or a few such devices, the benefits associated with employing microprocessors into the operation of the engines of outdoor power equipment may be compelling. For example, by monitoring engine RPM, various control measures can be instituted for shutting down individual devices if irregular performance is detected, predictive or preventive maintenance can be scheduled, and various other useful management services can be utilized.

In spite of the compelling reasons for monitoring such parameters as RPM in the engines of outdoor power equipment, the fact that there are different types of equipment, ages of devices in a fleet or an individual's personal holdings, and manufacturers for such devices can limit the ability to effectively manage the devices. Thus, it may be advantageous to provide a module that is capable of backfitting to augment older or less sophisticated devices, as well as enable usage of certain services for devices of multiple types or having different manufacturers.

BRIEF SUMMARY OF SOME EXAMPLES

Some example embodiments may provide an RPM module for insertion into outdoor power equipment driven by an engine. The RPM module may include an extraction interface configured to be inserted proximate to the engine to passively extract information indicative of RPM from the engine, an RPM monitor operably coupled to the extraction interface to convert the information indicative of RPM into RPM data, and processing circuitry configured to utilize the RPM data to perform control or monitoring of the engine based on the RPM data.

In another example embodiment, a riding lawn care device may be provided. The riding lawn care device may include an engine to selectively power the device, a frame supporting the engine of the device, and an RPM module. The RPM module may include an extraction interface configured to be inserted proximate to the engine to passively extract information indicative of RPM from the engine, an RPM monitor operably coupled to the extraction interface to convert the information indicative of RPM into RPM data, and processing circuitry configured to utilize the RPM data to perform control or monitoring of the engine based on the RPM data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
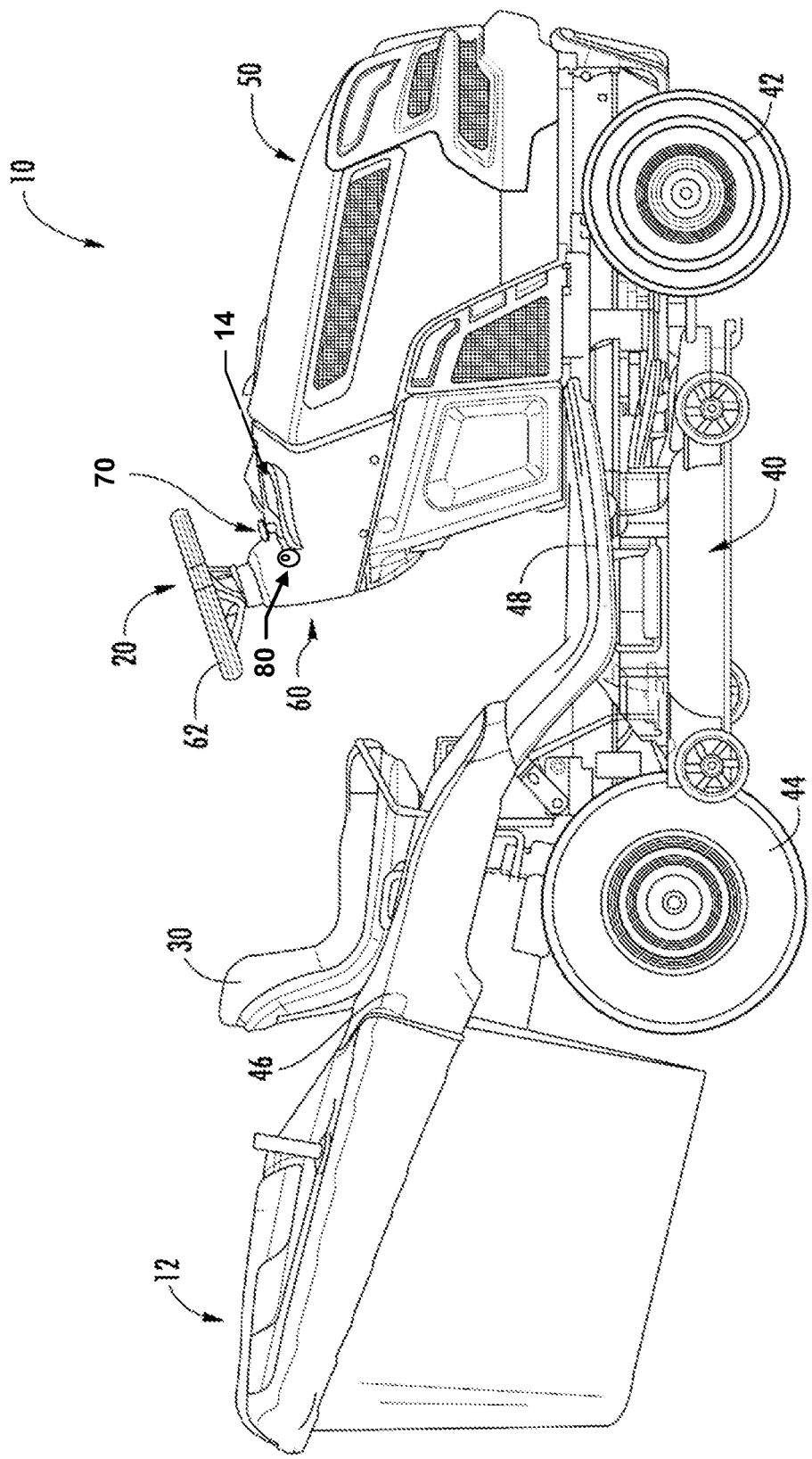
FIG. 1 illustrates a perspective view of the riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "lawn care" is meant to relate to any yard maintenance activity and need not specifically apply to activities directly tied to grass, turf or sod care. As used herein, operable coupling should be understood to relate to direct or indirect connection that, in either case, enables functional interconnection of components that are operably coupled to each other.

When a microprocessor is introduced into engine controls, the potential for employing additional functionality into the control and monitoring of the engine (and the corresponding outdoor power equipment) may be dramatically increased. For example, by providing a microprocessor in communication with a number of sensor and/or safety switch inputs, the corresponding inputs (each of which may be associated with respective different parameters of interest) may be monitored to try to determine certain situations for which intervention or other functional activity may be desired. One such parameter of interest is RPM (e.g., engine RPM).

A typical microprocessor-based system relies upon the microprocessor to assess situations and take actions. The ability to use a microprocessor for initiating various actions can often reduce part count and increase functional capabilities at the same time. Thus, there is significant motivation to rely on the microprocessor for as much control as possible. Within this context, the microprocessor is typically programmed to assess various sensor and/or switch positions to determine the status of corresponding components and make decisions regarding whether to initiate any applicable actions. The actions may include, in some cases, shutting down certain components or shutting down the entire device. However, the microprocessor could also be programmed to monitor certain components and make fault determinations that can be passed on to the operator. Additionally, fleet managers can monitor the operation of multiple devices to coordinate maintenance or even spot the potential onset of certain maintenance related conditions or failures. Thus, providing RPM readings to a microprocessor (such as an engine control unit (ECU) or vehicle control unit (VCU)) of outdoor power equipment can enable fleet managers or individual operators to more effectively use and manage their collective or individual devices.

However, as noted above, not all devices may be equipped with RPM monitoring capabilities either as presently configured or even as originally designed. Thus, obviously those devices lacking RPM monitors will individually lack certain individual controls that might otherwise be nice to have. However, the fleet manager or operator will also have gaps in his/her ability to manage all of the devices for which they are responsible. Thus, collective management of devices is also limited by the lack of RPM monitors.

Some example embodiments have therefore been provided to enable an RPM module, and in some cases also a microcontroller, to be added to devices to provide the capability to monitor and report RPM parameters in a consistent way across many types, designs, ages, or other variations in outdoor power equipment devices. Thus, for example, a VCU incorporating an example embodiment can effectively be integrated into, and monitor, engine RPM on almost any small engine system.

FIG. 1 illustrates an example lawn care device in the form of a riding lawn care vehicle 10 having a bagging attachment 12. However, it should be appreciated that example embodiments may be employed on numerous other riding lawn care vehicles that may not include a bagging attachment 12. The riding lawn care vehicle 10 may include an operations panel 14 that may display operational information regarding the riding lawn care vehicle 10 and host various controls, gauges, switches, lights, displays, and/or the like. As shown and described herein, the riding lawn care vehicle 10 may be a riding lawn mower (e.g., a lawn tractor, front-mount riding lawn mower, riding lawn mower with a zero or near zero degree radius of turn, cross mower, stand-on riding lawn mower, and/or the like). However, example embodiments may also or alternatively be employed on other outdoor power equipment devices, such as walk behind lawn mowers, tillers, snow throwers, and/or the like, or even on hand-held devices that employ relatively small gasoline or petrol engines.

The riding lawn care vehicle 10 may include a steering assembly 20 (e.g., including a steering wheel, handle bars, or other steering apparatus) functionally connected to wheels of the riding lawn care vehicle 10 to which steering inputs are provided (e.g., the front and/or rear wheels in various different embodiments) to allow the operator to steer the riding lawn care vehicle 10. In some embodiments, the riding lawn care vehicle 10 may include a seat 30 that may be disposed at a center, rear, or front portion of the riding lawn care vehicle 10. The operator may sit on the seat 30, which may be disposed to the rear of the steering assembly 20 to provide input for steering of the riding lawn care vehicle 10 via the steering assembly 20.

The riding lawn care vehicle 10 may also include, or be configured to support attachment of, a cutting deck 40 having at least one cutting blade mounted therein. In some cases, a height of the at least one cutting blade may be adjustable by an operator of the riding lawn care vehicle 10. The cutting deck 40 may be a fixed or removable attachment in various different embodiments. Moreover, a location of the cutting deck 40 may vary in various alternative embodiments. For example, in some cases, the cutting deck 40 may be positioned in front of the front wheels 42, behind the rear wheels 44, or in between the front and rear wheels 42 and 44 (as shown in FIG. 1) to enable the operator to cut grass using the at least one cutting blade when the at least one cutting blade is rotated below the cutting deck 40. In some embodiments, the cutting deck 40 may be lifted or rotated relative to the lawn mower frame to permit easier access to the underside of the lawn mower without requiring removal of the cutting deck 40. The cutting deck 40 may have one, two, three, or more cutting blades driven by one, two, three, or more rotatable shafts. The shafts may be rotated by any number of mechanisms. For example, in some embodiments, the shafts are coupled to a motor via a system of belts and pulleys. In other embodiments, the shafts may be coupled to the motor via a system of universal joints, gears, and/or other shafts. In still other embodiments, such as in an electric lawn mower, the shaft may extend directly from an electric motor positioned over the cutting deck.

In some embodiments, the front wheels 42 and/or the rear wheels 44 may have a shielding device positioned proximate thereto in order to prevent material picked up in the wheels from being ejected toward the operator. Fender 46 is an example of such a shielding device. When operating to cut grass, the grass clippings may be captured by a collection system (e.g., bagging attachment 12), mulched, or expelled from the cutting deck 40 via either a side discharge or a rear discharge.

The riding lawn care vehicle 10 may also include additional control-related components such as one or more speed controllers, brakes, cutting height adjusters, and/or the like. Some of the controllers, such as the speed controllers and/or brakes, may be provided in the form of foot pedals that may sit proximate to a footrest 48 (which may include a portion on both sides of the riding lawn care vehicle 10) to enable the operator to rest his or her feet thereon while seated in the seat 20.

In the pictured example embodiment of FIG. 1, an engine 50 of the riding lawn care vehicle 10 is disposed substantially forward of a seated operator. However, in other example embodiments, the engine 50 could be in different positions such as below or behind the operator. In some embodiments, the engine 50 may be operably coupled to one or more of the wheels of the riding lawn care vehicle 10 in order to provide drive power for the riding lawn care vehicle 10. In some embodiments, the engine 50 may be capable of powering two wheels, while in others, the engine 50 may power all four wheels of the riding lawn care vehicle 10. Moreover, in some cases, the engine 50 may manually or automatically shift between powering either two wheels or all four wheels of the riding lawn care vehicle 10. The engine 50 may be housed within a cover that forms an engine compartment to protect engine 50 components and improve the aesthetic appeal of the riding lawn care vehicle 10.

In an example embodiment, the engine compartment may be positioned proximate to and/or mate with portions of a steering assembly housing 60. The steering assembly housing 60 may house components of the steering assembly 20 to protect such components and improve the aesthetic appeal of the riding lawn care vehicle 10. In some embodiments, a steering wheel 62 of the steering assembly 20 may extend from the steering assembly housing 60 and a steering column (not shown) may extend from the steering wheel 62 down through the steering assembly housing 60 to components that translate inputs at the steering wheel 62 to the wheels to which steering inputs are provided.

In some embodiments, the engine 50 may also provide power to turn the cutting blade or blades disposed within the cutting deck 40. In this regard, for example, the engine 50 may be used to turn a shaft upon which the cutting blade or blades may be fixed (e.g., via a belt and pulley system and/or other mechanisms). The turning of the shaft, at high speeds, may move the cutting blade or blades through a range of motion that creates air movement that tends to straighten grass for cutting by the moving blade and then eject the cut grass out of the cutting deck 40 (e.g., to the bagging attachment 12 or to the back or side of the riding lawn care vehicle 10), unless the blade and mower are configured for mulching.

In an example embodiment, the engine 50 may turn at least one shaft that is coupled to corresponding ones of one or more cutting blades within the cutting deck 40 via a PTO clutch. When the PTO clutch is engaged, rotary power generated by the engine 50 may be coupled to the one or more cutting blades to cause rotation thereof (e.g., for cutting grass). When the PTO clutch is disengaged, rotary power generated by the engine 50 may not be coupled to the one or more cutting blades and thus the cutting blades may not rotate. In some embodiments, engagement of the PTO clutch may be accomplished via operation of a PTO switch 70 that may be disposed on or proximate to the operations panel 14.

The operations panel 14, or some other portion of the steering assembly housing 60, may also provide support for an ignition interface 80. The ignition interface 80 may be used for starting the engine 50 and for controlling other functions of the riding lawn care vehicle 10. In an example embodiment, the ignition interface 80 may or may not require a key to operate. Thus, the operator of the riding lawn care vehicle 10 may be enabled to start and/or initiate one or more functional capabilities of the riding lawn care vehicle 10 either with or without the use of a physical key using the ignition interface 80.

For a relatively robust and sophisticated device like the riding lawn care vehicle 10 of FIG. 1, it may be expected that the electronics onboard can either include, or be adapted to include RPM monitoring (and reporting). Moreover, a specific example RPM module for doing so will be discussed by way of non-limiting example in greater detail below in reference to FIG. 3. However, as noted above, it may be possible to employ RPM monitoring (and reporting) on smaller and less sophisticated units as well. Example embodiments may provide an RPM module that can be added to engine systems of almost any size to augment or add an RPM monitoring (and reporting) capability to such engine systems. Thus, FIG. 2 is provided as a high level, and generic example of an RPM module 90 in accordance with an example embodiment.

Figure 2:
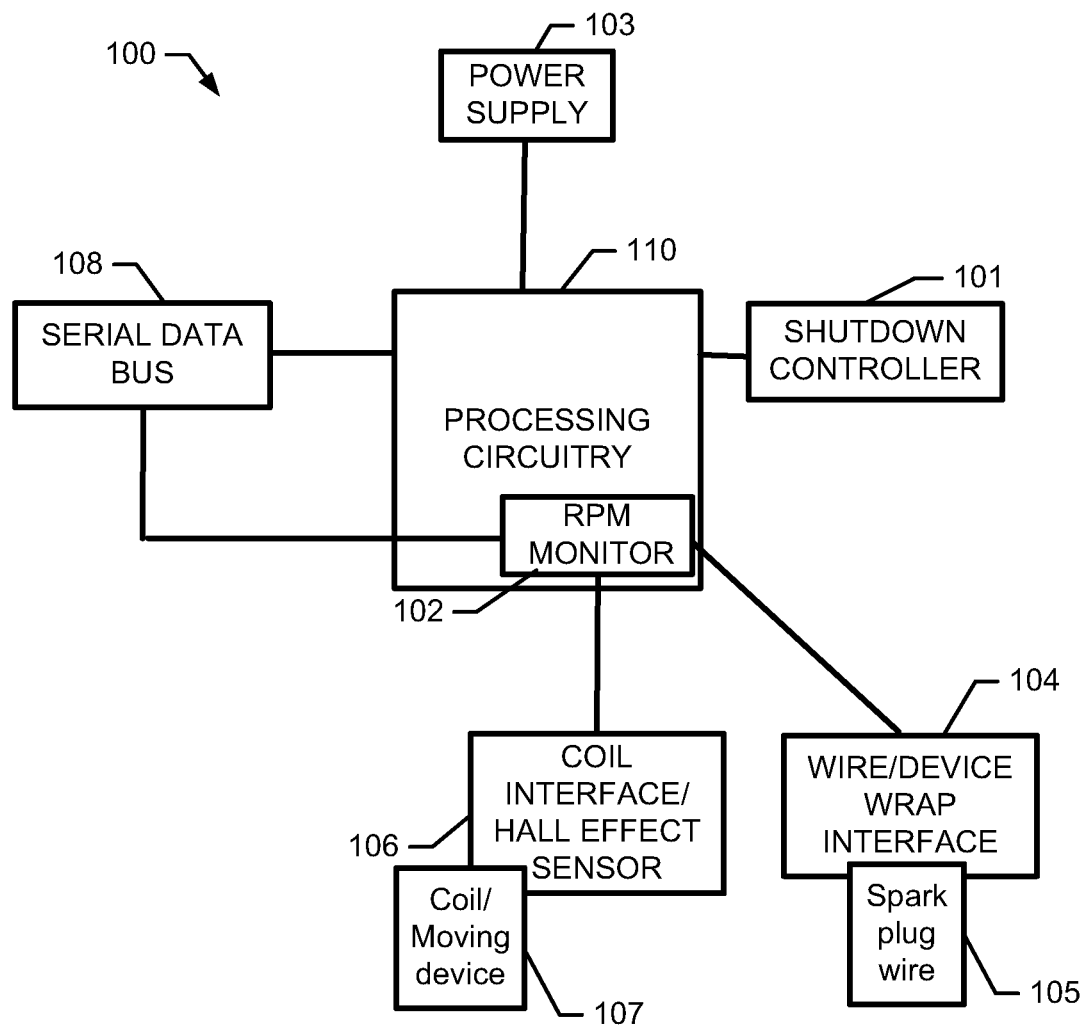
FIG. 2 illustrates a functional block diagram of an RPM module of an example embodiment.

In this regard, FIG. 2 illustrates a functional block diagram of the RPM module 100 of an example embodiment. As shown in FIG. 2, the RPM module 100 may include a shutdown controller 101 and an RPM monitor 102 that is configured to determine RPM data from information provided to the RPM monitor 102 by an extraction interface. The RPM module 100 may be powered from a power supply 103 (which may be a battery (e.g., battery unit 162 of FIG. 3) of the device being monitored. The RPM module 100 may also include processing circuitry 110, which will be described in greater detail below. However, it should generally be understood that the processing circuitry 110 can either include a microprocessor specifically for the RPM module 100, or may be a microprocessor or other controller of the device being monitored, which is capable of interfacing with the other components of the RPM module 100, and which is capable of being programmed to execute functions associated with supporting operation of the RPM module 100 as described herein.

The extraction interface may be a device, apparatus, or collection of components that are configured to extract (or enable extraction of) the RPM data from an engine (e.g., engine 50) or the circuitry associated with a device that includes the engine. The extraction interface may take a number of different forms, and thus, FIG. 2 illustrates multiple examples of potential extraction interfaces. In this regard, for example, the extraction interface may be embodied as a wire or device wrap 104. In such an example, the wire or device wrap 104 may include an inductive pickup element (e.g., a wire or other conductor) that can be wrapped or otherwise placed in close proximity to a component of the engine 50 from which RPM data can be extracted (i.e., via induction). In an example embodiment, the wire or device wrap 104 may be wrapped around a spark plug wire 105 of the engine 50 and inductively couple thereto in order to extract the RPM data passively from the spark plug wire 105.

Alternatively, the extraction interface may be embodied as a coil interface or Hall effect sensor 106. In such an example, the coil interface or Hall effect sensor 106 may be placed proximate to a coil or a moving device 107 (e.g., with a magnet thereon) of the engine 50 or otherwise indicative of RPM. Thus, when the fields change in the coil, or when the magnet moves past the Hall effect sensor, a reading may be obtained that may be indicative of RPM. Again, the RPM data may be passively extracted from the engine 50 using the RPM module 100 by providing RPM data to the RPM monitor 102 from the extraction interface simply by inserting the RPM module 100 into the device with the extraction interface appropriately positioned to passively extract the RPM data.

In another example embodiment, the extraction interface may simply monitor a low voltage signal on a bus or other electrical wire of the riding lawn care vehicle 10. For example, many larger pieces of outdoor power equipment may include a serial data bus 108 (e.g., a 12V local interconnection network (LIN) physical layer with a custom, proprietary or standard protocol). In some cases, the serial data bus 108 may be referred to as a "K-line." However, in other cases, the serial data bus 108 may have a proprietary name associated with the manufacturer of the outdoor power equipment. In either case, the processing circuitry 110 may be configured to "listen" to the serial data bus 108 for low voltage signals that may be indicative of RPM data. For example, the serial data bus 108 may have a 5V square wave thereon, which is proportional or otherwise indicative of RPM, and therefore may be used as the RPM data. Thus, by operably coupling the processing circuitry 110 to the serial data bus 108 and programming the processing circuitry 110 to look for, and lock onto, the 5V square wave signal (or any other signal) that is indicative of RPM, the RPM data can be extracted from a foreign machine (or any other machine into which the RPM module 100 is installed) without any major modification thereto.

The RPM monitor 102 may be configured to convert the data indicative of RPM (e.g., from the spark plug wire 105, from the coil or moving device 107, or from the serial data bus 108) into RPM data. The RPM data may then be stored and/or actively monitored during operation of the corresponding engine 50. If stored, the RPM data may be used to facilitate preventive maintenance, predictive maintenance, periodic maintenance, or other fleet management activities associated with the riding lawn care vehicle 10 (or the engine 50). For active monitoring during operation, the RPM data may be used to determine when fault conditions exist. If a fault condition is detected, the RPM module 100 may be configured to inform the operator (or fleet manager), or take action during operation (e.g., to shutdown the engine 50). Shutting the engine 50 down may be accomplished via the shutdown controller 101. In some cases, the shutdown controller 101 may issue a shutdown command (e.g., via the serial data bus 108) to an engine control unit of the engine 50 for the performance of a shutdown function 180. However, in other cases, the shutdown controller 101 may utilize other methods of control to shut the engine 50 down.

Figure 3:
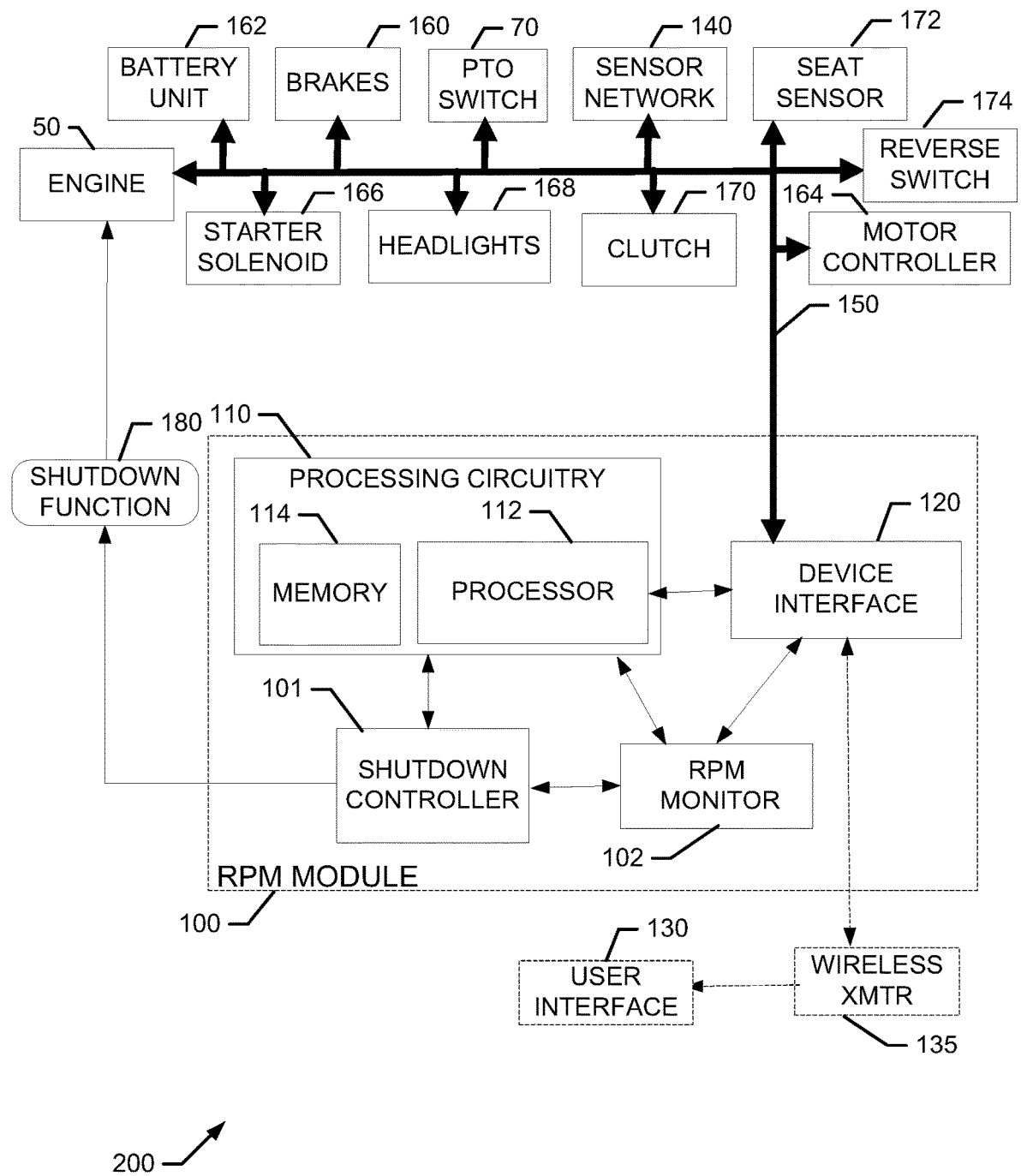
FIG. 3 illustrates a functional block diagram of a control system including the RPM module according to an example embodiment.

FIG. 3 illustrates a functional block diagram for explaining the operation of a vehicle or engine control system 200 incorporating the RPM module 100 of an example embodiment. As shown in FIG. 3, the RPM module 100 may include processing circuitry 110 to control operation of the engine 50 of the riding lawn care vehicle 10 of an example embodiment as described herein. In this regard, for example, the RPM module 100 may utilize the processing circuitry 110 to provide electronic control inputs to one or more functional units of the riding lawn care vehicle 10 and to process data generated by the one or more functional units regarding various operational parameters relating to the riding lawn care vehicle 10. The processing circuitry 110 may be configured to perform data processing, control function execution, and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components, and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface. As such, the processing circuitry 110 may be embodied as a circuit chip (e.g., an integrated circuit chip) configured (e.g., with hardware, software, or a combination of hardware and software) to perform operations described herein. However, in some embodiments, the processing circuitry 110 may be embodied as a portion of an on-board computer. In some embodiments, the processing circuitry 110 may communicate with electronic components and/or sensors of a sensor network 140 (e.g., sensors that measure variable values related to riding lawn care vehicle parameters) of the riding lawn care vehicle 10 via a single data bus or multiple data buses (e.g., data bus 150), which may form a portion of the device interface 120 or which may connect to the device interface 120. As such, the data bus 150 may connect to a plurality or all of the sensors, switching components, and/or other electrically-controlled components of the riding lawn care vehicle 10 to the processing circuitry 110.

In an example embodiment, the data bus 150 may further provide a mechanism by which the processing circuitry 110 can interface with or control other functional units of the riding lawn care vehicle 10. For example, in some embodiments, the data bus 150 may provide control inputs to and/or receive status inputs from functional units such as any or all of the engine 50, PTO switch 70, brakes 160 (which may include a parking brake), a battery unit 162, one or more motor controllers 164, a starter solenoid 166, headlights 168, clutch 170, seat sensor 172, reverse switch 174, and/or the like.

The user interface 130, if included, may be in communication with the processing circuitry 110 to receive an indication of a user input at the user interface 130 and/or to provide an audible, visual, mechanical, or other output to the user. As such, the user interface 130 may include, for example, a display, one or more levers, switches, buttons or keys (e.g., function buttons), and/or other input/output mechanisms. In an example embodiment, the user interface 130 may include the ignition interface 80, which may further include a plurality of light indicators, a plurality of function buttons, and/or a simple display.

The light indicators may be LEDs or LED backlit images that are lit or unlit to indicate corresponding status information. The information indicated by the light indicators may be directly related to the corresponding function buttons in some cases. However, in other cases, some of the light indicators may indicate status information associated with other functional units (e.g., those connected to the data bus 150). Meanwhile, the function buttons may be employed for initiation of various control operations to actuate or turn off corresponding ones of the functional units. However, in an example embodiment, the function buttons may also have an alternative functionality associated with starting of the engine 50.

In still other cases, the user interface 130 may be remotely located from the riding lawn care vehicle 10. Thus, for example, the user interface 130 may be located at a terminal or cell phone that is remotely located and communicatively coupled to the RPM module 100 via a wireless transmitter 135.

The device interface 120 may include one or more interface mechanisms for enabling communication with other devices (e.g., sensors of the sensor network 140 and/or other accessories or functional units such as motors, engines, servos, switches, or other operational control devices for providing control functions). In some cases, the device interface 120 may be any means such as a device or circuitry embodied in either hardware, or a combination of hardware and software that is configured to receive and/or transmit data from/to sensors in communication with the processing circuitry 110, e.g., via the data bus 150. Thus, for example, the device interface 120 may provide interfaces for communication of components of the riding lawn care vehicle 10 via the data bus 150.

The processor 112 may be embodied in a number of different ways. For example, the processor 112 may be embodied as various processing means such as one or more of a microprocessor or other processing element, a coprocessor, a controller, or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA, or the like, the processor 112 may be specifically configured hardware for conducting the operations described herein. Alternatively, as another example, when the processor 112 is embodied as an executor of software instructions, the instructions may specifically configure the processor 112 to perform the operations described herein.

The control system 200 may further include or be operably coupled to an instance of the RPM module 100 of an example embodiment. The RPM module 100 may be any means or device configured to perform the corresponding functionality of the RPM module 100 as described herein. In some cases, the RPM module 100 may include circuitry embodied in either hardware, or a combination of hardware and software that is configured to receive data provided from specific components, sensors or the like, from which RPM data can be extracted in order to determine RPM for provision to or use within the control system 200. The RPM module 100 and/or the control system 100 may then utilize the RPM data obtained by the RPM monitor 102 of the RPM module 100 to either generate messages or execute control functions (e.g., shutting down the engine 50) as described herein.

In an example embodiment, the processor 112 (or the processing circuitry 110) may be embodied as, include, or otherwise control the operation of the RPM module 100 based on inputs received by the processing circuitry 110 responsive to positioning of the function buttons and/or the operation of various ones of the functional units. As such, in some embodiments, the processor 112 (or the processing circuitry 110) may be said to cause each of the operations described in connection with the RPM module 100 in relation to operation of the functional units and/or function buttons to undertake the corresponding functionalities responsive to execution of instructions or algorithms configuring the processor 112 (or processing circuitry 110) accordingly. In an example embodiment, the processor 112 may be physically located within a body that can be inserted into the engine 50 and connected as described in greater detail below in reference to FIG. 4, and the processor 112 may be the processor for the entire riding lawn care vehicle 10.

In an exemplary embodiment, the memory 114 may include one or more non-transitory memory devices such as, for example, volatile and/or non-volatile memory that may be either fixed or removable. The memory 114 may be configured to store information, data, applications, instructions, or the like for enabling the processing circuitry 110 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative or additional capability, the memory 114 may include one or more databases that may store a variety of data sets responsive to input from the sensor network 140, functional units, and/or the function buttons. Among the contents of the memory 114, applications may be stored for execution by the processor 112 in order to carry out the functionality associated with each respective application. In some cases, the applications may include instructions for determining the RPM data from information extracted by the RPM monitor 102 (e.g., using the extraction interface) as described herein.

In an example embodiment, various ones of the functional units may impact each other. For example, the PTO switch 70 (which may be an electric or manual switch) may be used to alter a position of the clutch 170. Likewise, the motor controller 164 (if employed) may impact the application of battery power from the battery unit 162 to either a drive motor or a cutting motor. The position of the starter solenoid 166 may impact operation of the engine 50. Inputs regarding position of the brakes 160 and/or the PTO switch 70 may impact operation of the clutch 170, engine 50, and/or the like. Battery unit 162 status, status of the headlights 168, and/or other sensor network component status may be reported to and/or controlled by operation of the function buttons 134. Accordingly, it should be appreciated that the control system 200 of an example embodiment, and particularly the data bus 150 and the processing circuitry 110 may enable the user interface 130 to provide a relatively robust interface mechanism for controlling starter operation and numerous other functions of the riding lawn care vehicle 10.

Figure 4:
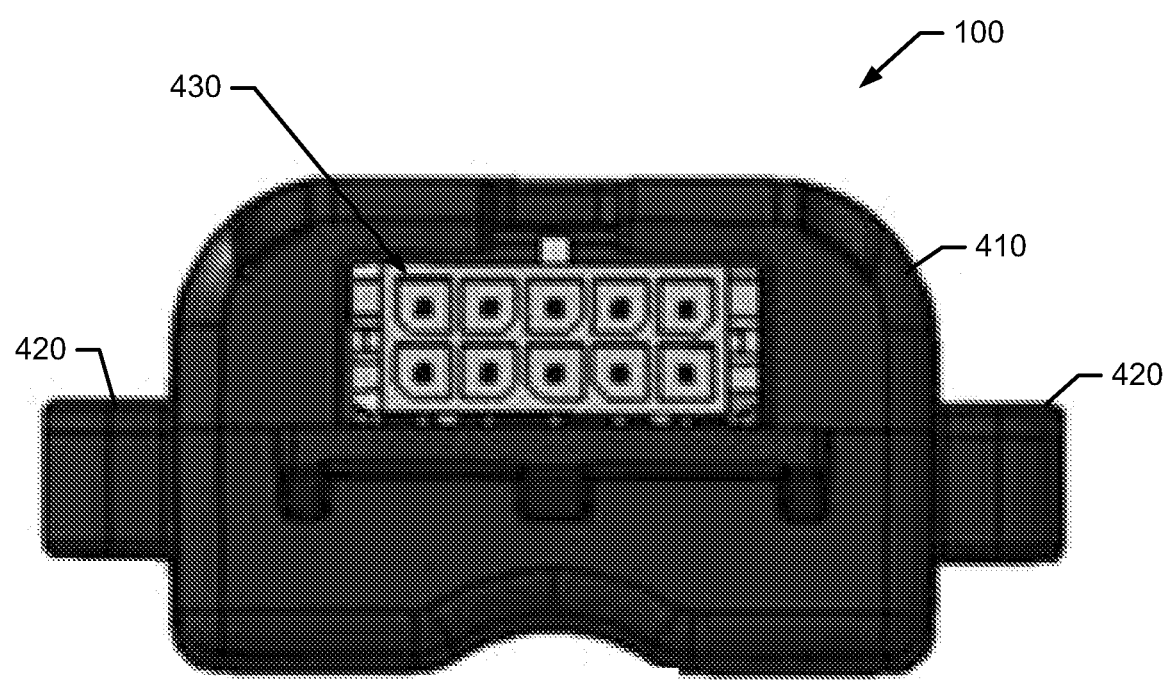
FIG. 4 illustrates a physical packaging that may be employed to provide the RPM module according to an example embodiment.

FIG. 4 illustrates a physical package that may embody the RPM module 100 of one example implementation. In this regard, the RPM module 100 may include a housing 410 including mounting structures 420, which may be used to affix the housing 410 to some portion of the engine 50 or of the riding lawn care vehicle 10 (or other outdoor power equipment) proximate to the engine 50 or components thereof from which RPM data may be extracted. In an example embodiment, the mounting structures 420 may enable the RPM module 100 to be wire-tied to a wiring harness of the riding lawn care vehicle 10. The housing 410 may be substantially dust and water resistant to protect the processing circuitry 110 therein. In some cases, the housing 410 may include potting, conformal coating, or other design features that facilitate the protective functions thereof. The housing 410 may be configured to, if possible, enable mounting to a flat surface. However, the capability to mount the housing 410 to other surfaces is also contemplated.

The RPM module 100 may also include an input interface 430, to which a cable may be operably coupled to make the connections to the processing circuitry 110 of the RPM module 100 as described above in reference to FIGS. 2 and 3. In some cases, the input interface 430 may be a 6 pin, 12 pin, or other standard connector. For example, the input interface 430 may be a Molex MicroFit 3.0 series 6 pin, or 12 pin connector. The main connector may be constructed to provide a 90 degree pin angle to the circuit board of the processing circuitry 110. The pins may be operably coupled to a ground output, one or more serial data buses (e.g., data bus 150 in the form of the K-line or proprietary examples of the serial data bus 108 of FIG. 2). An engine control unit ground output, used to provide the shutdown function 180, may also be provided as one of the pin connections along with a connection to the power supply 103 (e.g., the battery unit 162). Other pins may be dedicated to the low voltage input (e.g., associated with oil pressure) measured from the serial data bus 108, a low voltage input from a coil or Hall effect sensor, or the wire wrap RPM input (i.e., associated with respective ones of the coil interface or Hall effect sensor 106 and the wire/device wrap interface 104 of FIG. 2). Other inputs may also be provided in some cases.

Accordingly, some example embodiments may include an RPM module for insertion into outdoor power equipment driven by an engine. The RPM module may include an extraction interface configured to be inserted proximate to the engine to passively extract information indicative of RPM from the engine, an RPM monitor operably coupled to the extraction interface to convert the information indicative of RPM into RPM data, and processing circuitry configured to utilize the RPM data to perform control or monitoring of the engine based on the RPM data. In some cases, the engine may be originally manufactured without any RPM control or monitoring prior to insertion of the RPM module. However, it is also possible that even if the engine had RPM monitoring, but for a proprietary interface or system, example embodiments can be inserted across multiple devices of a fleet to standardize the RPM monitoring, reporting and/or control functions across the fleet.

In some embodiments, the system may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the extraction interface may be configured to inductively couple to a portion of the engine to obtain the RPM data. In some cases, the extraction interface may include a wire wrap configured to be wrapped around a spark plug wire of the engine, or a device wrap configured to be wrapped around a spark plug of the engine. In an example embodiment, the extraction interface may include a coil interface or a Hall effect sensor configured to passively determine the RPM data. In some cases, the extraction interface may be configured to receive a low voltage signal from a serial data bus operably coupled to the engine, and the low voltage signal may include the information indicative of RPM from the engine. In an example embodiment, the processing circuitry may be configured to monitor the serial data bus and extract the RPM data from the low voltage signal. In some cases, the processing circuitry may be configured to interface with a shutdown controller to execute a shutdown function based on the RPM data. In an example embodiment, the processing circuitry may be configured to determine a fault indication based on the RPM data and provide the fault indication to a remote device via wireless transmission. In some cases, the processing circuitry may be configured to determine a fault indication based on the RPM data and provide the fault indication to a user interface of the outdoor power equipment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A revolutions per minute (RPM) module for insertion into outdoor power equipment driven by an engine, the RPM module comprising:
    an extraction interface configured to be inserted proximate to the engine to passively extract information indicative of RPM from the engine;
    an RPM monitor operably coupled to the extraction interface to convert the information indicative of RPM into RPM data; and
    processing circuitry configured to utilize the RPM data to perform control or monitoring of the engine based on the RPM data,
    wherein the processing circuitry is exclusive to the RPM module,
    wherein the processing circuitry is operably coupled to a serial data bus of the outdoor power equipment and determines if unclassified serial data bus data is indicative of RPM data, and
    wherein, responsive to determining unknown serial bus data is indicative of RPM data, the processing circuitry is configured to lock onto and extract the RPM data from the serial data bus data.

2. The RPM module of claim 1, wherein the engine is manufactured without any RPM control or monitoring prior to insertion of the RPM module.

3. The RPM module of claim 1, wherein the extraction interface is configured to inductively couple to a portion of the engine to obtain the RPM data.

4. The RPM module of claim 3, wherein the extraction interface comprises a wire wrap configured to be wrapped around a spark plug wire of the engine, or a device wrap configured to be wrapped around a spark plug of the engine.

5. The RPM module of claim 1, wherein the extraction interface comprises a coil interface or a Hall effect sensor configured to passively determine the RPM data.

6. The RPM module of claim 1, wherein the extraction interface is configured to receive a low voltage signal from the serial data bus operably coupled to the engine, wherein the low voltage signal includes the information indicative of RPM from the engine.

7. The RPM module of claim 6, wherein the processing circuitry is configured to monitor the serial data bus and extract the RPM data from the low voltage signal.

8. The RPM module of claim 1, wherein the processing circuitry is configured to interface with a shutdown controller to execute a shutdown function based on the RPM data.

9. The RPM module of claim 1, wherein the processing circuitry is configured to determine a fault indication based on the RPM data and provide the fault indication to a remote device via wireless transmission.

10. The RPM module of claim 1, wherein the processing circuitry is configured to determine a fault indication based on the RPM data and provide the fault indication to a user interface of the outdoor power equipment.

11. A lawn care device comprising:
an engine to selectively power the device;
a frame supporting the engine of the device; and
a revolutions per minute (RPM) module for insertion into the lawn care device, the RPM module comprising:
an extraction interface configured to be inserted proximate to the engine to passively extract information indicative of RPM from the engine;
an RPM monitor operably coupled to the extraction interface to convert the information indicative of RPM into RPM data; and
processing circuitry configured to utilize the RPM data to perform control or monitoring of the engine based on the RPM data,
wherein the processing circuitry is exclusive to the RPM module,
wherein the processing circuitry is operably coupled to a serial data bus of the outdoor power equipment and determines if unclassified serial data bus data is indicative of RPM data, and
wherein, responsive to determining unknown serial bus data is indicative of RPM data, the processing circuitry is configured to lock onto and extract the RPM data from the serial data bus data.

12. The lawn care device of claim 11, wherein the engine is manufactured without any RPM control or monitoring prior to insertion of the RPM module.

13. The lawn care device of claim 11, wherein the extraction interface is configured to inductively couple to a portion of the engine to obtain the RPM data.

14. The lawn care device of claim 13, wherein the extraction interface comprises a wire wrap configured to be wrapped around a spark plug wire of the engine, or a device wrap configured to be wrapped around a spark plug of the engine.

15. The lawn care device of claim 11, wherein the extraction interface comprises a coil interface or a Hall effect sensor configured to passively determine the RPM data.

16. The lawn care device of claim 11, wherein the extraction interface is configured to receive a low voltage signal from the serial data bus operably coupled to the engine, wherein the low voltage signal includes the information indicative of RPM from the engine.

17. The lawn care device of claim 16, wherein the processing circuitry is configured to monitor the serial data bus and extract the RPM data from the low voltage signal.

18. The lawn care device of claim 11, wherein the processing circuitry is configured to interface with a shutdown controller to execute a shutdown function based on the RPM data.

19. The lawn care device of claim 11, wherein the processing circuitry is configured to determine a fault indication based on the RPM data and provide the fault indication to a remote device via wireless transmission.

20. The lawn care device of claim 11, wherein the processing circuitry is configured to determine a fault indication based on the RPM data and provide the fault indication to a user interface of the lawn care device.

* * * * *